United States Patent

Lozanou

[15] 3,644,246
[45] Feb. 22, 1972

[54] LUBRICATING STABILIZERS FOR CHLORINE-CONTAINING POLYMERS

[72] Inventor: Merrill Lozanou, East Lyme, Conn.

[73] Assignee: Chas. Pfizer & Co., Inc., New York, N.Y.

[22] Filed: Dec. 11, 1969

[21] Appl. No.: 884,377

[52] U.S. Cl. ............................ 260/23 XA, 252/406, 252/407, 260/31.2 R, 260/31.8 M, 260/31.8 R, 260/45.75 K, 260/45.85, 260/899

[51] Int. Cl. ........................................................ C08f 45/62

[58] Field of Search ................. 260/45.75 K, 23 X, 31.2 M, 260/31.8 U, 31.8 M, 899; 252/406, 407

[56] References Cited

UNITED STATES PATENTS

| | | | |
|---|---|---|---|
| 2,307,092 | 1/1943 | Yngve | 260/45.75 |
| 2,826,561 | 3/1958 | Gloskey | 260/45.75 |
| 2,838,554 | 6/1958 | Gloskey | 260/45.75 |
| 2,938,013 | 5/1960 | Mack | 260/45.75 |
| 3,296,289 | 1/1967 | Gloskey | 260/45.75 |
| 3,379,679 | 4/1968 | Besso | 260/45.75 |
| 3,448,067 | 6/1969 | Pemeck | 260/23 |

Primary Examiner—Donald E. Czaja
Assistant Examiner—V. P. Hoke
Attorney—Connolly and Hutz

[57] ABSTRACT

Lubricating heat and light stabilizer compositions for chlorine-containing polymers comprising a mixture of an organotin carboxylate and a metal salt of a monoalkyl ester of an unsaturated dicarboxylic acid, and plastic compositions prepared therefrom.

5 Claims, No Drawings 3,644,246

LUBRICATING STABILIZERS FOR CHLORINE-CONTAINING POLYMERS

BACKGROUND OF THE INVENTION

This invention relates to lubricating heat and light stabilizer compositions for chlorine-containing polymers and the stabilized plastic compositions prepared therefrom.

Because of the high temperature employed chlorine-containing polymers, such as polyvinyl chloride, undergo significant degradation during processing into finished articles. In addition, the finished products are also subject to degradation upon prolonged exposure to heat and light and are also adversely effected by atmospheric oxygen as well. When polyvinyl chloride resins are fused and blended for prolonged periods of time at high temperatures this degradation is manifested by color changes in the resin, which changes in color from colorless, to yellow, to red, to brown, and finally to black. Even finished articles will exhibit these color changes when maintained at high temperatures or exposure to light for prolonged periods of time.

Degradation of the resin during processing also causes it to become insoluble and infusible, thus making it difficult to prepare fabricated articles, or otherwise resulting in finished articles of inferior quality. Furthermore, because of the undesirable characteristics of resins which have undergone degradation, it becomes difficult to reutilize the waste scraps of resin obtained during the fabrication of products. Degradation in the finished articles causes them to become brittle and suffer loss of strength. These degradation problems have been obviated in part by the addition of heat and light stabilizers to the chlorine-containing polymers during processing. Among the heat stabilizers employed are the organotins, various lead compounds, and cadmium and zinc soaps. In particular, the metallic stearates, such as cadmium stearate, have been found to be good heat and light stabilizers. Nevertheless, the organotin compounds are the most efficient stabilizers for chlorine-containing polymers. Unfortunately, their high cost precludes wider acceptance, and as a result their use is restricted to specialized applications.

Another problem that arises during the processing of chlorine-containing polymers, especially with polyvinyl chloride, is that of the lubricity of the fused blend. There is always a tendency during processing for the resin to "plate out" on the mill or calender rolls and stick to the heated metal parts. Consequently, it is customary to incorporate a lubricant with the resin. The lubricant chosen, however, must establish the appropriate compatibility with the resin. If the lubricant is too compatible it will tend to plasticize the polymer, and if too incompatible it will tend to form a surface film or "bloom" on the finished plastic article. It has also been found that some lubricants are excellent heat and light stabilizers as well. These materials are designated lubricating stabilizers. The metallic stearates, such as zinc stearate, have found wide application as lubricating stabilizers. On the other hand, some stabilizers such as the organotin maleates present sticking problems during processing. In the latter situation appropriate lubricants or lubricating stabilizers must be added to the resin blend before processing.

It has now been found that various metal salts of certain monoalkyl esters of unsaturated dicarboxylic acids are excellent lubricating stabilizers for chlorine-containing polymers and when used with the organotin stabilizers, in particular the organotin maleates, provide excellent lubricity and heat and light stability. Plastic articles prepared with these compounds exhibit heat stability and particularly light stability, far superior to that shown by articles not containing these compounds. In addition, the use of the metal salts of these monoalkyl unsaturated esters in conjunction with the organotins enables one to use a lower level of the more expensive organotin with the chlorine-containing polymers and still obtain a high degree of heat and light stability.

SUMMARY OF THE INVENTION

This invention is concerned with novel plastic compositions comprising chlorine-containing polymers, organotin carboxylates, and metal salts of monoalkyl esters of unsaturated dicarboxylic acids wherein the metal cation is either sodium, calcium, magnesium, or aluminum; the monoalkyl radical contains from eight to 18 carbon atoms; and the unsaturated dicarboxylic acid is either maleic acid, fumaric acid, itaconic acid, citraconic acid, mesaconic acid, or glutaconic acid.

This invention is also concerned with novel lubricating heat and light stabilizer compositions for chlorine-containing polymers which comprise organotin carboxylates and metal salts of monoalkyl esters of unsaturated dicarboxylic acids wherein the metal cation is either sodium, calcium, magnesium, or aluminum; the monoalkyl radical contains from eight to 18 carbon atoms; and the unsaturated dicarboxylic acid is either maleic acid, fumaric acid, itaconic acid, citraconic acid, mesaconic acid, or glutaconic acid.

DETAILED DESCRIPTION OF THE INVENTION

The novel heat and light stabilized plastic compositions of this invention comprise a chlorine-containing polymer, an organotin carboxylate, and a sodium, calcium, magnesium, or aluminum salt of the monoalkyl ester of the following unsaturated dicarboxylic acids: maleic acid, fumaric acid, itaconic acid, citraconic acid, mesaconic acid, and glutaconic acid.

The monoalkyl radical of the ester group can be branched or straight chain and contain from eight to 18 carbon atoms. Any chlorine-containing polymer derived from an ethylenically unsaturated monomer can be used in practicing the present invention. Typical examples include: poly(vinyl chloride), vinyl chloride-vinyl acetate copolymers, vinyl chloride-propylene copolymers, vinyl chloride-alkyl vinyl ether copolymers, poly(vinyl chloride)-chlorinated polyethylene mixtures, mixtures of poly(vinyl chloride) and terpolymers of acrylonitrile/butadiene/styrene, mixtures of poly(vinyl chloride) and terpolymers of methyl methacrylate/butadiene/styrene, mixtures of poly(vinyl chloride) and acrylic modifiers or ethylene-propylene rubber.

The lubricating heat and light stabilizer compositions are incorporated with the above polymers to give the desired plastic compositions. The stabilizer compositions comprise an organotin carboxylate and the previously mentioned metal salts of the monoalkyl half-esters.

The use of organotin carboxylates containing up to 12 carbon atoms in the carboxylate moiety is preferred in the present invention. Typical representatives include the following well-known compounds: dibutyl tin maleate, di-n-octyl tin maleate, dibutyl tin bis(monocyclohexyl maleate), di-n-octyl tin bis(monocyclohexyl maleate), dibutyl tin bis(monomethyl maleate), di-n-octyl tin bis(monomethyl maleate), dibutyl tin bis(mono-2-methylhexyl maleate), di-n-octyl tin bis(mono-n-octyl maleate), dibutyl tin dilaurate, and di-n-octyl tin dilaurate.

The organotin carboxylates have been described in the literature and are commercially available. They can, however, be readily prepared by techniques familiar to those skilled in the art. See, for example, Smith, "Organotin Stabilizers," Tin Research Institute, Middlesex, England, 1959, pp. 5–6.

As mentioned above, it has now been found that superior lubricating stabilizer compositions can be prepared by using these organotin carboxylates in conjunction with the calcium, sodium, aluminum and magnesium salts of the aforementioned monoalkyl half-esters. These latter compounds are readily prepared by conventional synthetic procedures well known to those skilled in the art. For example, the monoalkyl ester can be first prepared from the dicarboxylic acid and the appropriate alcohol by standard esterification reactions, and then reacted with a metallic salt or base containing the desired metallic cation. The preferred salts in this series are the magnesium and aluminum monoalkyl maleates and fumarates, and in particular magnesium and aluminum stearyl maleate.

Although the herein-described metal salts of the half-esters are effective as lubricating stabilizers when used alone, the present invention contemplates their use in conjunction with the organotin carboxylates described above to give the novel stabilizing compositions of the present invention.

The organotin carboxylates are well-known heat and light stabilizers for chlorine-containing polymers. Some of them, such as the dialkyl tin dilaurates, are lubricating stabilizers as well. Nevertheless, many of the compounds in this series, in particular the dialkyl tin maleates, do not possess the requisite lubricity and must be used in conjunction with suitable lubricating agents. It has now been found that when the metal salts of the monoalkyl esters of the herein described unsaturated acids are used in conjunction with these dialkyl tin carboxylates with chlorine-containing polymers there is an enhancement in the heat and light stability of the resulting resin blend and the plastic articles manufactured therefrom. In addition, the metal salts of the monoalkyl half-esters provide the lubricity needed for the processing of the chlorine-containing polymers into finished articles. Thus, the metal salts are especially effective when used with the dialkyl tin maleates, providing not only increased light and heat stability, but the essential lubricity as well. Accordingly, when used together, the organotin carboxylates and the metal salts of the monoalkyl esters of the herein described unsaturated dicarboxylic acids provide lubricating heat and light stabilizing compositions having superior characteristics.

Generally, 0.5 to 3.0 parts by weight of the organotin carboxylate and 0.30 to 1.50 parts of the metal salts of the half-esters can be used per 100 parts of the chlorine-containing polymers. An especially preferred formulation comprises 1.0–2.0 parts of organotin carboxylate, 0.8–1.2 parts of metal salt of the half-ester, and 100 parts of resin.

Other additives can be added to the polymer blend as required. Thus, for certain purposes antioxidants would be added to protect against oxidative degradation. Plasticizers can also be used without affecting the properties of the stabilizing systems. It has been found that the coaddition of an organotin mercaptide or organotin mercaptoester with the lubricating stabilizer compositions of the present invention results in a further improvement in light stability and in particular heat stability. Among the organotin mercaptides that have been found effective are dibutyl tin bis (laurylmercaptide) and dibutyl tin bis (hexadecylmercaptide). Typical representatives of the organotin mercaptoesters include dibutyl- and di-n-octyl tin bis (2-ethylhexyl thioglycollate), and dibutyl- and di-n-octyl tin β-mercaptopropionate.

The carboxylates and the metal salts of the half-esters are usually first blended together before mixing them with the chlorine-containing polymers, particularly where the stabilizer compositions are to be stored or transported before using. This aspect of the invention is not critical, however, and if desired each component can be separately added to the polymer and the blended mixture charged to a two roll mill heated at about 350°–400° F.

The heat and light stability of the resultant flexible sheets are then determined. Standard accelerated test procedures such as the Atlas Fadeometer Test, using UV light or the Xenotest UNIT, using a Xenon light source, can be used. After exposure the samples are periodically examined to determine the degree of discoloration which has occurred. The amount of discoloration of the samples is an indication of the extent of degradation that has taken place. Static and dynamic heat stability tests are then carried out. The static heat stability tests are conducted by placing a series of samples of the plastic sheets in a circulating air oven at about 360° F. for 3 hours and removing specimens at 15 minute intervals and determining the degree of discoloration. The dynamic heat stability tests are conducted by continuously milling various formulations containing the stabilizing compositions at 350° F. Specimens are taken at 2 minute intervals and examined for discoloration.

Extended outdoor experiments were also conducted in Arizona and Florida to determine the light stability and rate of deterioration of physical properties of plastic compositions containing the herein described stabilizers over long periods of time. Comparison tests were run using commercial stabilizers as well. The results clearly show that the stabilizer compositions of the instant invention provide a remarkable degree of heat and light stability to the finished chlorine-containing polymer articles as well as providing excellent lubricity and heat and light stability to the chlorine-containing polymers during processing. The finished plastic articles employing the instant stabilizer compositions are found to possess outstanding clarity, color, and surface gloss.

The following examples are provided to illustrate further the scope of the present invention, but should not be construed as limitations thereof.

EXAMPLE 1

Light Stability Studies

A. Outdoor Exposure

The formulations below were milled on a two roll plastic mill with roll friction ratio of 1:1.4 (Model 3–V–500 Research Mill, Farrel Corporation, Ansonia, Connecticut). Mill temperature was set at 350° F., and milling time was 6 minutes. The milled sheets were press polished between ferrotype plates at 375° F., 1,000 p.s.i. for 3 minutes. Thickness of the finished samples varied from 30 to 40 mils.

| Ingredients, weight per hundred parts of resin (phr) | 1 | 2 | 3 | 4 | 5 | 6 | 7 | 8 |
|---|---|---|---|---|---|---|---|---|
| Geon 103EPF7 resin[1] | 100 | 100 | 100 | 100 | 100 | 100 | 100 | 100 |
| Stan-Guard 156[2] | 2.0 | | 2.0 | 2.0 | 2.0 | 2.0 | 2.0 | 2.0 |
| Dibutyl tin bis (cyclohexyl maleate) | | 3.0 | | | | | | |
| Tinuvin P[3] | 0.3 | 0.3 | 0.3 | 0.3 | 0.3 | 0.3 | 0.3 | 0.3 |
| A/C PE629[4] | 0.2 | 0.2 | | | | | | |
| Calcium monostearyl maleate | | | 0.75 | | | | | |
| Lead monostearyl maleate | | | | 0.75 | | | | |
| Stearyl maleic acid | | | | | 0.75 | | | |
| Stearyl fumaric acid | | | | | | 0.75 | | |
| Aluminum monostearyl maleate | | | | | | | 0.75 | |
| Magnesium monostearyl maleate | | | | | | | | 0.75 |

[1] Medium molecular weight polyvinyl chloride (PVC) homopolymer resin (average molecular weight ca. 140,000, K=68) obtained from B. F. Goodrich Chemical Co., Cleveland, Ohio.

[2] Dibutyl tin bis (methyl maleate) heat and light stabilizer, supplied by Chas. Pfizer & Co., Inc., New York, New York.

[3] Benzotriazole-type ultraviolet light absorber supplied by Geigy Chemical Co., Ardsley, New York.

[4] Low molecular weight polyethylene lubricant supplied by Allied Chemical Co., New York, New York.

Panels having the above composition were mounted against well-aged pinewood backing and set outdoors facing 45° South in Phoenix, Arizona.

The results obtained are listed below.

| Sample | Langleys[1] | UVSH[2] | Amount of Exposure Required for Sample to Undergo Yellow Discoloration |
|---|---|---|---|
| 1 | 134,766 | 1391 | 10 months |
| 2 | 134,766 | 1391 | 10 months |
| 3 | 134,766 | 1391 | 10 months |
| 4 | 119,020 | 1244 | 9 months |
| 5 | 149,140 | 1510 | 11 months |
| 6 | 149,140 | 1510 | 11 months |

| | | | |
|---|---|---|---|
| 7 | 164,621 | 1756 | 12 months |
| 8 | 207,972 | 2226 | 15 months |

[1]Langley is one gram-calorie/cm[2].

[2]UVSH (ultraviolet sun hour) is defined as any 60 minute period during which the sun intensity exceeds 0.823 gram-calories/cm[2] min. (0.823 Langley/min.).

These results show that considerable improvement is obtained with the metal salts of the half-esters herein described. Of particular note is the 50 percent increase in stability imparted by the magnesium monostearyl maleate.

B. Accelerated Light Exposure

The formulations below were prepared in the same manner as described in (A) above, and the milled sheets were exposed to a Xenon arc in the Xenotest 150 (Quarzlampen Gesellschaft M.B.H., Hanau, West Germany) at 95 percent relative humidity and air temperature of 30° C. The black panel temperature was 50° C.

| Ingredients Weight per hundred parts of resin (phr) | Sample No. | | | |
|---|---|---|---|---|
| | 9 | 10 | 11 | 12 |
| Geon 103EPF7 resin | 100 | 100 | 100 | 100 |
| Stanguard 156 | 20 | 20 | | 1.8 |
| Dibutyltin bis (cyclohexyl maleate) | | | 2.0 | |
| Stearic acid | 0.5 | | | |
| Hoechst wax GL-3[1] | | 0.6 | 0.6 | |
| Hoechst wax OP[1] | | 0.4 | 0.4 | |
| Magnesium monostearyl maleate | | | | 1.0 |

[1]PVC lubricants supplied by American Hoechst Corp., Mountainside, New Jersey.

| | Sample No. | | | |
|---|---|---|---|---|
| | 9 | 10 | 11 | 12 |
| Hours of exposure in Xenotest 150 needed to cause yellow discoloration | 1250 | 600 | 600 | >2000 |

Accelerated light stability tests were also conducted with an Atlas Fadeometer (Atlas Electric Devices Co., Chicago, Illinois).

The samples below were prepared in the manner indicated above.

| Ingredients Weight per hundred parts of resin (phr) | Sample No. | | |
|---|---|---|---|
| | 13 | 14 | 15 |
| Exon 9269[1] | 100 | 100 | 100 |
| Dibutyltin maleate T-290 | 1.00 | 1.00 | 1.00 |
| Hoechst wax OP | 0.50 | | |
| Hoechst wax GL | 0.50 | | |
| A/C PE629 | | | 0.10 |
| Magnesium monostearyl maleate | | 1.00 | 1.00 |

[1]Medium-low molecular weight (ca. 120,000, K=64) homopolymer PVC resin obtained from Firestone Plastics Co., Pottstown, Pa.

The fadeometer results are given below:

FADEOMETER RESULTS

| Time | Sample No. 13 | Sample No. 14 | Sample No. 15 |
|---|---|---|---|
| Initial Color | slightly opaque/ slightly yellow | clear/colorless | slightly cloudy/ slightly yellow |
| 100 hours | slightly brown | clear/colorless | slightly red tint |
| 200 hours | darker brown | clear/colorless | slightly red tint |
| 300 hours | dark brown | clear/colorless | very slightly brown |
| 400 hours | blackish brown | tint of red | slightly brown |
| 500 hours | grayish black | tint of red | slightly brown |
| 600 hours | grayish black | tint of red | slightly brown |
| 700 hours | grayish black | tint of red | slightly brown |
| 800 hours | grayish black | reddish very small brown specks | slightly brown/ very small black specks |
| 900 hours | black | more brown specks | slightly brown/ additional black specks |
| 1000 hours | black | light brown/ black specks | slightly brown/ additional black specks |
| 1100 hours | black | light brown/ black specks | slightly brown/ additional black specks |
| 1200 hours | black | light brown/ black specks | blackish brown/ small black specks |

From the above results, it is seen that the magnesium monostearyl maleate improves the formulation and vastly extends the exposure time before discoloration occurs. It is further apparent that magnesium monostearyl maleate permits the use of lower concentrations of the more expensive organotin stabilizer while improving performance, thus reducing the overall cost of the formulation.

It has previously been shown that lead salts, such as basic lead silicate, with monoalkyl fumarates or monoalkyl maleates are good heat stabilizers. Results of accelerated and outdoor exposures described above have demonstrated that lead derivatives are poor light stabilizers, however, and actually detract from the light stabilizing effectiveness of the organotin maleate esters.

It has also been shown that certain inorganic magnesium salts improve the light stability of poly(vinyl chloride). Accordingly, effectiveness of these systems was determined with the formulations listed in the tables below and compared to the system containing magnesium monostearyl maleate:

| Ingredients Weight per hundred parts of resin (phr) | Sample No. | | | | |
|---|---|---|---|---|---|
| | 16 | 17 | 18 | 19 | 20 |
| Geon 103EPF7 resin | 100 | 100 | 100 | 100 | 100 |
| Dibutyltin maleate (Advastab T-290)[1] | 1.0 | 1.0 | 1.0 | 1.0 | 1.0 |
| Trimagnesium phosphate | | 1.0 | | | |
| Basic magnesium carbonate | | | 1.0 | | |
| Hoechst wax GL-3 | 1.0 | 1.0 | 1.0 | | |
| Magnesium stearyl maleate | | | | 0.75 | 1.0 |

[1]Advance Division, Carlisle Chem. Works, Inc.

| Sample No. | 16 | 17 | 18 | 19 | 20 |
|---|---|---|---|---|---|
| Hours of exposure in Xenotest 150 needed to cause yellow discoloration | 200 | 400 | 400 | >800 | >800 |

The samples containing trimagnesium phosphate (No. 17) and basic magnesium carbonate (No. 18) were yellower in color, had poorer clarity than the control (No. 16), and showed considerably more flexural stress whitening. The samples containing magnesium stearyl maleate (Nos. 19 & 20), on the other hand, showed marked improvement in stability and gave much better initial color than the control, water-white by comparison, with as good, if not better, clarity and less stress whitening.

The accelerated tests above show the inorganic salts to be inferior in enhancing light stability. After 400 hours of Xenotest exposure, Formulations No. 17 and 18 began to discolor and develop haze whereas after 800 hours No. 19 and 20 appeared colorless and unchanged in clarity. (The control started to discolor after 200 hours.) Based on previous correlations between Xenotest exposure and outdoor weathering, these results indicate that more than a fourfold improvement can be obtained by the use of the magnesium salts of the present invention.

EXAMPLE II

Heat Stability Studies

A. Static Heat Stability

The formulations below were milled for 6 minutes at a roll temperature of 350° F. and sheeted at 40 mils. Samples from the sheets were subjected to heat in a circulating air oven at 356° F. for 3 hours (180 minutes) with specimens removed at 15 minute intervals to show the heat history. Comparisons for initial color were made on the milled sheets and noted as 0' (0 minutes) time.

| Ingredients, weight per hundred parts of resin (phr.) | Sample number | | | | | | | | | |
|---|---|---|---|---|---|---|---|---|---|---|
| | 21 | 22 | 23 | 24 | 25 | 26 | 27 | 28 | 29 | 30 |
| Geon 103 EPF 7 resin | 100 | 100 | 100 | 100 | 100 | 100 | 100 | 100 | 100 | 100 |
| Stan-Guard 156 | 2.0 | 2.0 | 2.0 | 2.0 | 2.0 | 2.0 | 2.0 | 2.0 | 2.0 | 1.8 |
| A/C PE 629 | 0.2 | | | | | | | | | |
| Calcium stearate | | 1.0 | | | | | | | | |
| Aluminum stearate | | | 1.0 | | | | | | | |
| Magnesium stearate | | | | 1.0 | | | | | | |
| Calcium monostearyl maleate | | | | | 1.0 | | | | | |
| Aluminum monostearyl maleate | | | | | | 1.0 | | | | |
| Magnesium monostearyl maleate | | | | | | | 1.0 | | | 1.0 |
| Aluminum monostearyl fumarate | | | | | | | | 1.0 | | |
| Magnesium monostearyl fumarate | | | | | | | | | 1.0 | |

| Sample: | Physical appearance |
|---|---|
| 21 | Excellent clarity. |
| 22 | Translucent. |
| 23 | Fair clarity. |
| 24 | Do. |
| 25 | Do. |
| 26 | Excellent clarity. |
| 27 | Do. |
| 28 | Good clarity. |
| 29 | Fair clarity. |
| 30 | Excellent clarity. |

The static heat stability results are given below.

STATIC HEAT STABILITY AT 356° F.

| Minutes | Sample [1] | | | | | | | | | |
|---|---|---|---|---|---|---|---|---|---|---|
| | 21 | 22 | 23 | 24 | 25 | 26 | 27 | 28 | 29 | 30 |
| 0 | 0 | 1 | 1 | 1 | 0 | 0 | 0 | 0 | 0 | 0 |
| 30 | 1 | 2 | 3 | 2 | 1 | 1 | 1 | 1 | 1 | 1 |
| 60 | 2 | 3 | 3 | 3 | 1 | 1 | 1 | 1 | 1 | 2 |
| 90 | 3 | 3 | >3 | 3 | 2 | 2 | 2 | >2 | 2 | 3 |
| 120 | 4 | 4 | 4 | 4 | 2 | 2 | 2 | 3 | >2 | 3 |
| 180 | 5 | 5 | 5 | 5 | 4 | >4 | 4 | 5 | >4 | >4 |

[1] 0=Colorless; 1=Very slightly yellow; 2=Slightly-moderately yellow; 3=Yellow; 4=Deep yellow; 5=Black.

The above results show that the metal derivatives of the half-esters are highly effective in enhancing heat stability and are much better than the corresponding salts of the fatty acids. They provide better initial color, less color development, and longer term stability. As shown above, a reduction in the level of the more expensive organotin stabilizer is possible without loss in stabilizing activity as compared to control.

B. Dynamic Heat Stability

The dynamic mill stability of the 3 samples below was determined by milling the formulations continuously at 350° F., with a back roll speed of 40 feet per minute until complete degradation had occurred. The specimen chips were sampled at 2 minute intervals to show the color development.

| Ingredient, Weight per hundred parts of resin (phr) | Sample No. | | |
|---|---|---|---|
| | 31 | 32 | 33 |
| Geon 103EPF7 resin | 100 | 100 | 100 |
| Stan-Guard 156 | 2.0 | 2.0 | 1.8 |
| A/C PE629 | 0.2 | | |
| Magnesium Mono Stearyl Maleate | | 0.75 | 1.0 |

| | Sample | | |
|---|---|---|---|
| Milling time required to develop: | 31 | 32 | 33 |
| a. Slight color | 18' | 18' | 18' |
| b. Intense Color | 60' | 66' | 60' |
| c. Degradation (term) | 74' | 86' | 74' |
| Color at term | black | dark tan | dark tan |

The data obtained above with the dynamic milling procedure shows that magnesium monostearyl maleate provides at least as good if not better early stability as the control with less color development and significantly longer term.

Dynamic termal stability (DTS) studies were determined with the formulations below in a Brabender Plasticorder (C. W. Brabender Instruments, Inc., South Hackensack, New Jersey).

The formulations were charged to an intensive mixer, Roller No. 6 measuring head attachment to the Brabender Plasticorder. This instrument records the work required for mixing in terms of metergrams of torque, and also records the temperature during mixing. The time to degradation is determined from the torque curve and is a measure of the 'DTS' or dynamic thermal stability of the formulation. The data was obtained using the following conditions:

Jacket temperature—125° C.
Shear rate—60 r.p.m.
Charge—57 grams
The formulations and results are given below.

| Ingredient, weight per hundred parts of resin (phr.) | Sample Number | | | | | | | | |
|---|---|---|---|---|---|---|---|---|---|
| | 34 | 35 | 36 | 37 | 38 | 39 | 40 | 41 | 42 |
| Geon 103 EPF 7 resin | 95 | 95 | 95 | 95 | 95 | 95 | 95 | 95 | 95 |
| Acryloid K-120N [1] | 5 | 5 | 5 | 5 | 5 | 5 | 5 | 5 | 5 |
| Stan-Guard 156 | 1.9 | 1.9 | 1.9 | 1.9 | 1.9 | 1.9 | 1.9 | 1.9 | 1.9 |
| A/C PE 629 | 0.2 | | | | | | | | |
| Sodium monostearly maleate | | 1.0 | | | | | | | |
| Calcium monostearyl maleate | | | 1.0 | | | | | | |
| Aluminum monostearyl maleate | | | | 1.0 | | | | | |
| Magnesium monostearyl maleate | | | | | 1.0 | | | | |
| Sodium monostearyl fumarate | | | | | | 1.0 | | | |
| Calcium monostearyl fumarate | | | | | | | 1.0 | | |
| Aluminum monostearyl fumarate | | | | | | | | 1.0 | |
| Magnesium monostearyl fumarate | | | | | | | | | 1.0 |
| Fusion torque, metergrams | 7,000 | 6,700 | 7,000 | 6,800 | 6,900 | 6,750 | 6,700 | 6,950 | 6,950 |
| 'Steady state' torque, metergrams | 3,750 | 3,750 | 3,700 | 3,700 | 3,700 | 3,750 | 3,725 | 3,775 | 3,800 |
| Stock temperature, °C | 187 | 185 | 187 | 184 | 185 | 185 | 186 | 185 | 185 |
| DTS, minutes | 8.3 | 21.5 | 16.3 | 13.0 | 15.5 | 20.7 | 21.5 | 17.5 | 20.0 |

[1] Polymethyl methacrylate processing aid supplied by Rohm and Haas Co., Philadelphia, Pennsylvania.

The above results show that corresponding salts of the fumarate ester (Sample Nos. 39–42) exhibit outstanding term stability. The use of these compounds would allow greater reprocessing of scrap resin.

Comparative heat stability studies were determined with Samples 13, 14 and 15 of Example I.

The Mill Testing was run at 350° F., 375° F., and 400° F., on two roll mill at 30 f.p.m. with continuous rolling bank. The results are given below:

| Sample No. | Temperature 350° F. Lubricity Time to Sticking | Heat Stability |
|---|---|---|
| 13 | 40 min. | 40 min.-dk. yellow |
| 14 | 15-20 min. | 40 min.-sl. yellow |
| 15 | 25 min. | 40 min.-yellow |
| Sample No. | Temperature 375° F. Lubricity Time to Sticking | Heat Stability |
| 13 | 15 min. | 15 min.-dk. brown |
| 14 | 10 min. | 15 min.-sl. yellow |
| 15 | 10 min. | 15 min.-yellow |
| Sample No. | Temperature 400° F. Lubricity Time to Sticking | Heat Stability |
| 13 | 10 min. | 10 min.-black |
| 14 | 8 min. | 10 min.-yellow |
| 15 | 8 min. | 10 min.-yellow |

The magnesium monostearyl maleate increased heat stability and incorporated a fair degree of lubricity. Resin with dibutyltin maleate T-290 and no lubricant stuck immediately to the mill.

EXAMPLE III

Effects of Outdoor Exposure on Physical Characteristics

Clear, rigid PVC panels, 5 inches × 3 inches × 0.045 inch, were prepared from the formulations below, and were set outdoors in Sarasota, Florida for 2 years. The panels were mounted against wood backing facing 45° South. The total radiation over this period was 322,057 langleys at 4,102 ultraviolet sun hours. The total rainfall during this period was 80 inches.

PERCENT RETENTION OF PHYSICAL PROPERTIES

| Sample Number: | Ingredients [1] | Tensile modulus, percent | Yield strength, percent | Yield Elongation, percent | Tensile strength, percent | Ultimate elongation, percent |
|---|---|---|---|---|---|---|
| 43 | Stan Guard 156, 2.0 hpr A/C PE 629, 0.3 phr | 85 | 105 | 112 | 104 | 30 |
| 43M | Sample 43 and Plaskon 103 impact modifier.[2] | 94 | 106 | 98 | 101 | 40 |
| 44 | Stan-Guard 156 2.0 phr Magnesium stearyl maleate 0.75 phr. | 94 | 105 | 116 | 104 | 50 |
| 44M | Sample 44 and Plaskon 103 impact modifier. | 96 | 107 | 112 | 100 | 52 |
| 45 | Stan Guard 156, 2.0 phr Aluminum stearyl maleate 0.75 phr. | 95 | 109 | 117 | 110 | 40 |
| 45M | Sample 45 and Plaskon 103 impact modifier. | 97 | 107 | 106 | 100 | 47 |

[1] Based on 100 parts Geon 103EPF7 resin (phr.).
[2] Chlorinated polyethylene, supplied by Allied Chemical Corp., New York, N. Y.

These results show that in each case the metal salts of the alkyl maleate half-esters improve the retention of physical properties particularly with regard to ultimate elongation. This property is considered the more sensitive criterion of failure on weathering and high retention is desirable. Loss of tensile modulus and yield strength indicates increase in stiffness, and high retention of these properties is also desirable.

EXAMPLE IV

In samples 3, 7, 8, 12, 14, 15, 19, 20, 25–30, 32, 33, and 35–42 of Examples I–III, the poly(vinyl chloride) resin (Geon 103 EPF 7) is replaced with an identical quantity of the resins listed in a. to d. below (or blended with reinforcing modifiers such as listed in e. to j. below) to give plastic compositions having excellent heat and light stability properties:

a. after-chlorinated poly(vinyl chloride)
b. vinyl chloride/vinyl acetate copolymer (VYNW, Union Carbide Plastics Co., New York, New York)
c. vinyl chloride/propylene copolymer (Airco 401, Airco Chemicals and Plastics, New York, New York)
d. vinyl ether/vinyl chloride copolymer (Plaskon PVC CG014, Allied Chemical Corp., New York, New York)
e. ethylene-propylene rubber
f. chlorinated polyethylene (Allied Chemical Corp., New York, New York)
g. acrylonitrile/butadiene/styrene terpolymer (Blendex 401, Marbon Chemical, Div. of Borg-Warner Corp., Washington W.V.)
h. methyl methacrylate/butadiene/styrene terpolymer (KM 607, Rohm and Haas Co., Philadelphia, Pennsylvania)
i. internally plasticized poly(vinyl chloride) copolymers (Vinnol H 315/65, Wacker Chemie GMBH, Munich, West Germany)
j. vinyl ester/ethylene modified poly(vinyl chloride) (Vinnol VH 350, Wacker Chemie GMBH)

EXAMPLE V

When the dibutyltin bis(methyl maleate) (Stan-Guard 156) in Samples 1, 3–12, and 21–42 and the dibutyl tin maleate (Advastab T-290) in Samples 13–20 in the above examples, are replaced with an equivalent amount of the organotin carboxylates listed below, substantially the same results are obtained:

a. dibutyl tin dilaurate
b. di-n-octyl tin dilaurate
c. di-n-octyl tin maleate
d. dibutyl tin bis(monocyclohexyl maleate)
e. di-n-octyl tin bis(monocyclohexyl maleate)
f. di-n-octyl tin bis(monomethyl maleate)
g. dibutyl tin bis(mono-2-ethylhexyl maleate)
h. dibutyl tin monolaurate mono(2-ethylhexyl maleate)
i. dibutyl tin bis(monostearyl maleate)
j. di-n-octyl tin bis(mono-n-octyl maleate)

EXAMPLE VI

The following plastic compositions in the Table below are compounded according to the procedures of the preceding Examples, using 100 parts of poly(vinyl chloride) (Geon 103 EPF 7) in every case.

| Organotin carboxylate | | Metal Salt of Monoalkyl Ester of Unsaturated Dicarboxylic Acid |
|---|---|---|
| 0.5 phr dibutyl tin maleate | + | 1.5 phr magnesium mono stearyl maleate |
| 0.5 phr dibutyl tin dilaurate | + | 1.5 phr magnesium mono-n-(octyl maleate) |
| 0.5 phr di-n-octyl tin dilaureate | + | 1.2 phr magnesium mono lauryl maleate |
| 0.5 phr di-n-octyl tin maleate | + | 1.2 phr magnesium monomyristyl maleate |

| | | |
|---|---|---|
| 1.0 phr dibutyl tin maleate | + | 1.0 phr magnesium monocetyl maleate |
| 1.0 phr dibutyl tin bis(mono methyl maleate) | + | 1.0 phr calcium monolauryl maleate |
| 1.0 phr di-n-octyl tin bis (monomethyl maleate) | + | 0.50 phr sodium monocetyl maleate |
| 1.0 phr di-n-octyl tin bis (monomethyl maleate) | + | 0.30 phr aluminum mono-n-octyl maleate |
| 1.5 phr dibutyl tin bis(mono stearyl maleate) | + | 0.75 phr magnesium mono-n-octyl fumarate |
| 1.5 phr dibutyl tin maleate | + | 0.75 phr aluminum monocetyl fumarate |
| 1.5 phr di-n-octyl tin dilaurate | + | 0.50 phr calcium monolauryl fumarate |
| 1.5 phr di-n-octyl maleate | + | 0.50 phr magnesium mono stearyl itaconate |
| 2.0 phr dibutyl tin dilaurate | + | 0.30 phr sodium monocetyl itaconate |
| 2.0 phr dibutyl tin bis(mono methylmaleate) | + | 0.30 phr calcium monolauryl itaconate |
| 2.0 phr dibutyl tin maleate | + | 0.75 phr aluminum monomyristyl itaconate |
| 2.0 phr di-n-octyl tin dilaurate | + | 1.0 phr aluminum mono-n-octyl citraconate |
| 2.5 phr di-n-octyl bis (monomethyl maleate | + | 1.0 phr magnesium mono cetyl citraconate |
| 2.5 phr dibutyl tin maleate | + | 1.0 phr sodium monostearyl citraconate |
| 2.5 phr di-n-octyl tin dilaurate | + | 1.25 phr magnesium mono stearyl mesaconate |
| 2.5 phr di-n-octyl tin maleate | + | 1.25 phr calcium monocetyl mesaconate |
| 2.5 phr di-n-octyl bis(mono methyl maleate) | + | 1.25 phr aluminum monomyristyl mesaconate |
| 3.0 phr dibutyl tin maleate | + | 0.75 phr sodium monolauryl mesaconate |
| 3.0 phr dibutyl tin dilaurate | + | 1.5 phr sodium mono-n-octyl glutaconate |
| 3.0 phr di-n-octyl tin maleate | + | 1.0 phr calcium monocetyl glutaconate |
| 3.0 phr dibutyl tin bis(mono methyl maleate) | + | 0.30 phr magnesium mono stearyl glutaconate |
| 3.0 phr dibutyl tin maleate | + | 0.30 phr aluminum mono lauryl glutaconate |

The above plastic compositions are found to possess excellent heat and light stability characteristics.

EXAMPLE VII

The formulations below were prepared as described in Example I.

| Ingredients, Weight per hundred parts of resin, phr | Sample No. | | |
|---|---|---|---|
| | 46 | 47 | 48 |
| Geon 103 EPF 7 resin | 100 | 100 | 100 |
| dibutyl tin maleate | 3.0 | 1.5 | 1.5 |
| dibutyl tin β-mercaptopropionate | | 1.5 | 1.5 |
| magnesium monostearyl maleate | | | 0.75 |

Milled sheets of the above formulations were exposed to a Xenon arc as previously described.

| Sample No. | Results |
|---|---|
| 46 | Moderate discoloration after 1700 hours |
| 47 | Slight discoloration after 1700 hours |
| 48 | No discoloration after 2000 hours |

The above results show the further improvement in light stability obtained when an organotin mercaptoester is used in conjunction with an organotin carboxylate and a metal salt of the monoalkyl esters of the herein-described unsaturated dicarboxylic acids.

Similar results are obtained when the dibutyl tin β-mercaptopropionate is replaced with:
di-n-octyl tin β-mercaptopropionate
dibutyl tin bis(2-ethylhexyl thioglycollate)
di-n-octyl tin bis(2-ethylhexyl thioglycollate)
dibutyl tin bis(laurylmercaptide)
dibutyl tin bis(hexadecylmercaptide)

I claim:
1. A plastic composition comprising:
   a. a chlorine-containing polymer selected from the group consisting of a homopolymer of vinyl chloride, a copolymer of vinyl chloride with other ethylenically unsaturated monomers and mixtures of said homopolymer or copolymer of vinyl chloride with polymers derived from other ethylenically unsaturated monomers;
   b. an dialkyltin salt of an acid selected from the group consisting of a saturated aliphatic monocarboxylic acid containing up to 12 carbon atoms in the carboxylate moiety, maleic acid, and half-esters of maleic acid derived from a saturated aliphatic alcohol having up to 18 carbon atoms or cyclohexanol; and
   c. a metal salt of a monoalkyl ester of an unsaturated dicarboxylic acid; wherein the metal cation of said salt is sodium, calcium, magnesium, or aluminum; the monoalkyl radical contains from eight to 18 carbon atoms; and said unsaturated dicarboxylic acid is selected from the group consisting of maleic acid, fumaric acid, itaconic acid, citraconic acid, mesaconic acid, and glutaconic acid, wherein the proportion by weight of said organotin salt per hundred parts of chlorine-containing polymer is from 0.5 to 3.0, and the proportion by weight of said metal salt per hundred parts of chlorine-containing polymer is from 0.30 to 1.50.

2. A plastic composition comprising:
   a. a chlorine-containing polymer selected from the group consisting of poly(vinyl chloride), after chlorinated poly(vinyl chloride), a vinyl chloride-vinyl acetate copolymer, a vinyl chloride-propylene copolymer, a vinyl ether-vinyl chloride copolymer, a mixture of poly(vinyl chloride) with chlorinated polyethylene, and a mixture of a vinyl ester-ethylene modified poly(vinyl chloride);
   b. an organotin carboxylate selected from the group consisting of dibutyl tin dilaurate, dibutyl tin maleate, di-n-octyl tin dilaurate, di-n-octyl tin maleate, dibutyl tin bis(monocyclohexyl maleate), di-n-octyl tin bis(monocyclohexyl maleate), di-butyl tin bis(monomethyl maleate), and di-n-octyl tin bis(monomethyl maleate), and dibutyl tin bis(mono-2-ehtylhexyl maleate); and
   c. a metal salt selected from the group consisting of magnesium monostearyl maleate, aluminum monostearyl maleate, calcium monostearyl maleate, sodium monostearyl maleate, magnesium monostearyl fumarate, aluminum monostearyl fumarate, calcium monostearyl fumarate, and sodium monostearyl fumarate.

3. A plastic composition comprising:
   a. a chlorine-containing polymer selected from the group consisting of a homopolymer of vinyl chloride, a copolymer of vinyl chloride with other ethylenically unsaturated monomers and mixtures of said homopolymer or copolymer or vinyl chloride with polymers derived from other ethylenically unsaturated monomers;
   b. an dialkyltin salt of an acid selected from the group consisting of a saturated aliphatic monocarboxylic acid containing up to 12 carbon atoms in the carboxylate moiety, maleic acid, and half-esters of maleic acid derived from a saturated aliphatic alcohol having up to 18 carbon atoms or cyclohexanol;
   c. a metal salt of a monoalkyl ester of an unsaturated dicarboxylic acid; wherein the metal cation of said salt is sodium, calcium, magnesium, or aluminum; the monoalkyl radical contains from eight to 18 carbon atoms; and said unsaturated dicarboxylic acid is selected from the group consisting of maleic acid, fumaric acid, itaconic acid, citraconic acid, mesaconic acid, and glutaconic acid, and the proportion by weight of said organotin salt per hundred parts of chlorine-containing polymer is from 0.5 to 3.0, and the proportion by weight of said metal salt per hundred parts of chlorine-containing polymer is from 0.30 to 1.50; and
   d. an organotin mercaptoester or an organotin mercaptide.

4. A lubricating heat and light stabilizer composition for chlorine-containing polymers which comprises:
   a. a dialkyltin salt of an acid selected from the group consisting of a saturated aliphatic monocarboxylic acid containing up to 12 carbon atoms in the carboxylate moiety, maleic acid and half-esters of maleic acid derived from a saturated aliphatic alcohol having up to 18 carbon atoms or cyclohexanol.

b. a metal salt of a monoalkyl ester of an unsaturated dicarboxylic acid; wherein the metal cation of said salt is sodium, calcium, magnesium, or aluminum; the monoalkly radical contains from eight to 18 carbon atoms; and said, unsaturated dicarboxylic acid is selected from the group consisting of maleic acid, fumaric acid, itaconic acid, citraconic acid, mesaconic acid, and glutaconic acid; wherein the ratio by weight of said organotin salt to said metal salt is from 0.33 to 10.

5. A lubricating heat and light stabilizer composition for chlorine-containing polymers which comprises:

a. an organotin carboxylate selected from the group consisting of dibutyl tin dilaurate, dibutyl tin maleate, di-n-octyl tin dilaurate, di-n-octyl tin maleate, dibutyl tin bis (monocyclohexyl maleate), di-n-octyl tin bis(monocyclohexyl maleate), di-butyl tin bis (monomethyl maleate), di-n-octyl tin bis(monomethyl maleate), and dibutyl tin bis(mono-2-ethylhexyl maleate); and b. a metal salt selected from the group consisting of magnesium monostearyl maleate, aluminum monostearyl maleate, calcium monostearyl maleate, sodium monostearyl maleate, magnesium monostearyl fumarate, aluminum monostearyl fumarate, calcium monostearyl fumarate, and sodium monostearyl fumarate.

* * * * *

UNITED STATES PATENT OFFICE
CERTIFICATE OF CORRECTION

Patent No. 3,644,246      Dated February 22, 1972

Inventor(s) Merrill Lozanov

It is certified that error appears in the above-identified patent and that said Letters Patent are hereby corrected as shown below:

Please correct the inventor's name (twice occurred) "Lozanou" to -- Lozanov --.

Please correct the corporate name of assignee "Chas. Pfizer & Co., Inc." to -- Pfizer Inc. --

Signed and sealed this 3rd day of October 1972.

(SEAL)
Attest:

EDWARD M. FLETCHER, JR.
Attesting Officer

ROBERT GOTTSCHALK
Commissioner of Patents